June 10, 1952 G. W. VON HOFE Re. 23,512

MACHINE AND METHOD FOR APPLYING LABELS TO ARTICLES ON A CONVEYER

Original Filed April 25, 1945

INVENTOR
George W. von Hofe
BY
Frederick Breitenfeld
ATTORNEY

Reissued June 10, 1952

Re. 23,512

UNITED STATES PATENT OFFICE 23,512

MACHINE AND METHOD FOR APPLYING LABELS TO ARTICLES ON A CONVEYER

George W. von Hofe, Bound Brook, N. J., assignor to New Jersey Machine Corporation, Hoboken, N. J., a corporation of New Jersey Original No. 2,524,945, dated October 10, 1950, Serial No. 590,199, April 25, 1945. Application for reissue November 20, 1951, Serial No. 257,296

50 Claims. (Cl. 216—25)

Matter enclosed in heavy brackets [ ] appears in the original patent but forms no part of this reissue specification; matter printed in italics indicates the additions made by reissue.

The invention relates to labeling mechanisms for applying labels to articles and has for its object to provide a novel mechanism operating in the presence of an activating agent such as heat for attaching labels by means of thermo-activated adhesives to the articles for which said labels are designed.

The invention contemplates further the provision of a novel mechanism for applying heat to labels coated with a material which normally is inherently inactive as an adhesive and which subsequent to the application of heat becomes activated and remains so for a time period and then permanently sets as an adhesive bond, and to deposit said labels, while said material is activated, to the articles for which said labels are intended.

A further object of the invention is to provide mechanisms of the type indicated in which provision is made at a labeling station to apply pressure to the deposited labels to adhesively attach the same to the articles, and to maintain said pressure during a time period in which the labeled articles are transported away from the labeling station.

Other objects will appear from the description hereinafter, and the features of novelty will be pointed out in the claims.

In the accompanying drawings, which illustrate examples of the invention without defining its limits, Fig. 1 is a diagrammatical sectional view showing one form of the novel mechanism;

The novel mechanism comprises an endless conveyer on the surface of which the labels, coated with a material which is thermo-activatable, are held by suction or otherwise with the coated surfaces exposed, and conveyed into coacting relation with activating means whereby the coatings are activated. In the case of labels coated with thermo-activatable materials, the activating means may develop heat whereby said thermo-activatable materials are caused to become tacky. The endless conveyer may be in the form of a cylindrical drum, an endless belt, or of any other suitable type, and in any case, adhesively applies the labels to the articles for which they are intended. Pressure means, which may include the endless conveyer, subsequently effective on the labels at a labeling station, completes the adhesive application thereof to said articles.

Figure 1:
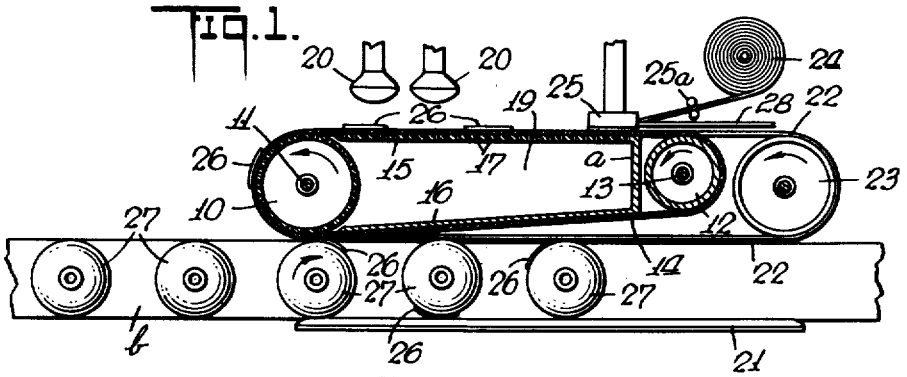
Figure 2:
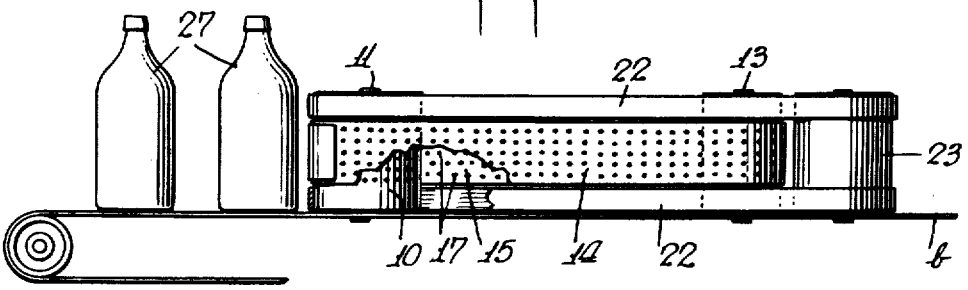
Fig. 2 is a fragmentary elevation of Fig. 1.

In the form shown in Figs. 1 and 2, the novel mechanism comprises a hollow perforated roll 10 fixed upon a shaft 11 mounted in the machine in suitable bearings, and an associated hollow, preferably unperforated, roll 12 fixed upon a shaft 13 mounted in suitable bearings in the machine at a distance from the roll 10. The endless conveyer, illustrated in the form of a perforated endless belt 14, extends between and passes over the rolls 10 and 12, which may be driven in any conventional manner to operate the belt 14 in the direction indicated by the arrows. In the preferred arrangement of the selected examples, the runs of the belt 14 pass over and in surface engagement, respectively, with suitably-mounted rigid plates 15 and 16 extending between the rolls 10 and 12 inside of said belt 14. These plates form part of an enclosure, including an end member "a," which defines a vacuum chamber 19 as illustrated diagrammatically in Fig. 1, this chamber being in communication with the interior of the perforated roll 10. The plate 15 is provided throughout with perforations 17, but the plate 16 may be unperforated.

The arrangement is such that suction is maintained in the chamber 19 in any convenient manner, for instance, by connecting the interior of the perforated roll 10 with a suitable source of suction.

Figure 3:
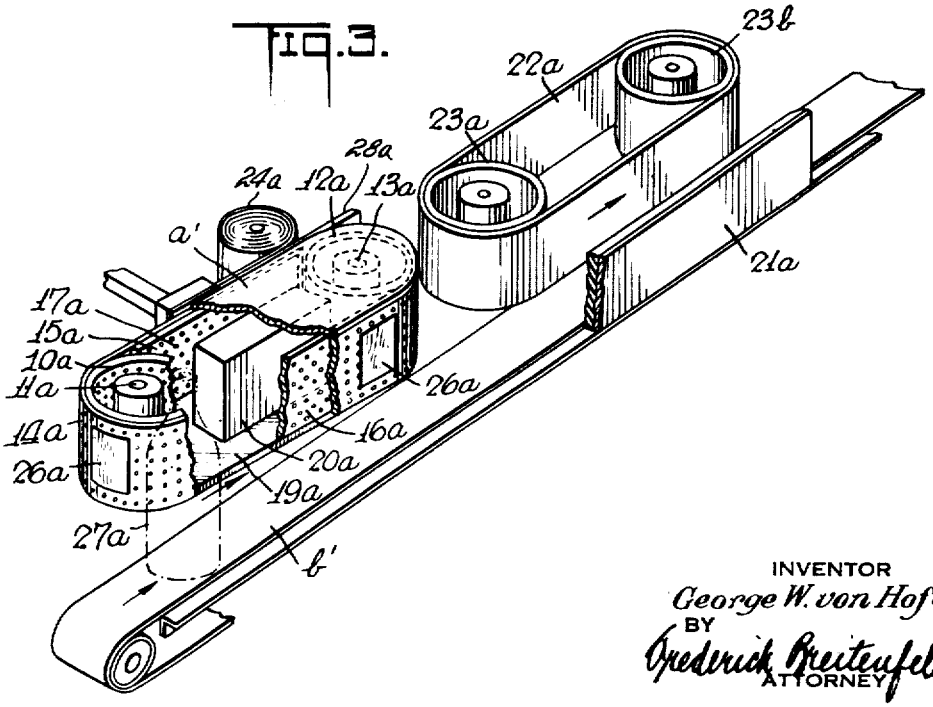
Fig. 3 is a diagrammatic perspective view illustrating another form of the novel mechanism.

In addition, the mechanism comprises activating means for activating the coatings on the labels as exemplified by means for applying heat to the labels, or more specifically to the coatings thereof, such heat-applying means being independent of the belt 14 and being located either exteriorly of said belt 14 as indicated diagrammatically in Fig. 1, or interiorly thereof as illustrated in Fig. 3.

The heat-applying means may be of any suitable and conventional type, and as shown in Fig. 1, may comprise electrically-operated heat-developing devices in the nature of lamps 20 mounted in suitable numbers alongside of and in operative relation to the one run of the belt 14, and controlled in any well-known way.

To complete the adhesive application of the labels to the articles, the mechanism preferably includes pressure means for pressing the labels into firm adhesive connection with said articles. In the diagrammatically-illustrated example, the pressure means comprises a pressure member or plate 21 suitably mounted to develop a maximum adhesive bond between the label and the article. The material used is preferably one which may be normally untacky and inactivated and which, after activation by heat, remains tacky for an appreciable period of time before finally setting.

For cooperation with the pressure member 21, the mechanism further is provided with means exemplified by associate belts 22 passing around a roll 23 and around the outer end portions of the roll 10 along opposite side edges of the belt 14. The roll 23 preferably is so located and dimensioned that the one of the runs of each of the belts 22 is in divergent relation to one run of the belt 14 in the direction of travel, and thereby, in addition to its other functions, acts as a diverting band as will appear more fully hereinafter.

The labels to be applied to the articles may be delivered individually to the mechanism, for instance, by being severed by means of conventional cutting means 25 from a continuous band of labels mounted in the form of a roll 24 in operative relation to the mechanism. Feed rolls 25–a may be conveniently mounted for guiding the band of labels from the roll 24 to the cutting means 25. Suitable provision is made for delivering the articles to be labeled to the labeling station of the mechanism.

In practice, the labels 26 are delivered to the one run of the belt 14 with the coated surfaces exposed, and are held in place thereon because of the suction which is effective through the perforations 17 and the perforations of the belt 14. As the mechanism is operated, the belt 14 advances the labels in the presence of heat, for instance, by carrying said labels into heat-exchange relation with the heating devices 20. The thermo-activatable coatings or their equivalent are thereby activated and, with the coatings in this condition, the labels 26 are carried along and at a point distant from the devices 20, are applied to the articles 27 which, in the meantime, have been delivered to the pressure member 21 in any suitable and convenient manner.

As the operation of the mechanism proceeds, the articles 27, which generally speaking, are of circular or approximately circular cross-section, are carried on a travelling conveyer such as a belt "b" and finally reach the position in relation to the belt 14 or its equivalent at which a label 26 is located. The leading edge of said label 26 adheres to the article 27 and as the latter is rotated along the pressure member or plate 21 by the *combined* action of *the belt 14 and* the [belt] *belts* 22, said label 26 is progressively applied to said article 27. *Fig. 1 of the drawings shows the position of the article to which a label 26 has been applied, relative to the belts 14 and 22 and plate 21, at the moment when the application of such label to the article 27 has been completed by the combined action of the belts 14 and 22 and plate 21.* As said article 27 [traverses] *continues its transversement of* said member or plate 21, the applied label 26 is subjected to successive pressures by the member or plate 21 in cooperation with the [belt] *belts* 22, and is thereby caused to firmly adhere to said article 27. Because of the divergent relation of the one run of each of the belts 22 to the belt 14, the article 27, after the initial application of the label 26 *in the nip formed by the belt 14 and the plate 21*, is diverted from the belt 14 and moved away from the labeling station. Consequently, an appreciable time period for the initial setting of the coating is provided, and the bond of the label to the article is efficient and accomplished in a simple and continuous manner.

Positioned between the feed rolls 25a and the belts 22 and 14 is a plate 28. The end adjacent to the cutter 25 cooperates with the latter in the cutting function. The body of the plate acts as a shield to prevent any residual heat in either of the belts 22 and 14 from [permanently] *prematurely* affecting the coating on the roll 24.

The form shown in Fig. 3 comprises a hollow perforated roll 10–a and an associated hollow, preferably solid, roll 12–a, said rolls being carried, respectively, by shafts 11–a and 13–a journalled in suitable bearings in the machine of which they form a part. A perforated endless belt 14–a extends between and passes over the rolls 10–a and 12–a, which may be driven in any convenient manner to operate the belt 14–a in the direction of the arrow. The arrangement preferably is such that the belt 14–a and more especially the one run thereof travels at an angle to a given path of travel, for instance, as illustrated. This form may also include suitably-mounted rigid plates 15–a and 16–a extending between the rolls 10–a and 12–a inside of the belt 14–a and forming part of an enclosure, including member "a'," to provide a chamber 19–a which is in communication with the interior of the roll 10–a through the perforations thereof as illustrated, diagrammatically, in Fig. 3. The plates 15–a and 16–a may be provided throughout with perforations 17–a.

In this form, also, the arrangement is such that a partial vacuum or suction is maintained in the chamber 19–a, for instance, by connecting the interior of the perforated roll 10–a with a suitable source of suction.

This embodiment of the invention also includes pressure means for pressing the initially-applied labels into firm adhesive connection with the articles for which said labels are designed. As diagrammatically illustrated in Fig. 3, such pressure means may comprise a pressure member or plate 21–a suitably mounted in operative position, and corresponding to the pressure member or plate 21 of Fig. 1. *As also shown in Fig. 3, the plates 21 and 21–a on the sides thereof adjacent to the belts "b" and "b'," respectively, are provided with facings of rubber.*

For cooperation with the pressure member 21–a, the mechanism is provided with an associate belt 22–a mounted on a roll 23–a and an associate roll 23–b. The rolls 23–a and 23–b are spaced apart and suitably mounted in the machine to locate the one run of the belt 22–a in operative relation to the pressure member or plate 21–a.

In this form, the heat-applying means 20–a is located inside of the belt 14–a and between the rolls 10–a and 12–a in the chamber 19–a, said heat-applying means 20–a being of any suitable type, preferably actuated electrically and controlled in any convenient manner.

As in the form first described, the labels may be delivered individually to the mechanism either manually, automatically, or by being successively cut from a continuous strip 24a of such labels as suggested in connection with the form shown in Fig. 1.

Positioned between the belt 14a and the roll 24a is a plate 28a corresponding to that shown at 28 in Fig. 1 and fulfilling a similar function.

In practice, the labels 26–a are delivered to the one run of the belt 14–a with the thermo-activatable coatings exposed, and are held in place thereon because of the suction which is effective through the perforated chamber 19–a and the perforations of the belt 14–a. As the mechanism is operated, the belt 14–a advances the labels 26–a in the presence of heat, developed, for instance, by the interior heating means 20–a, to thereby activate the thermo-activatable coatings or their equivalent. In this condition, the labels 26–a are carried along to the labeling station and are there deposited on the articles 27–a which, in the meantime, have been transported to the mechanism in any suitable manner, as by means of a conveyer such as the belt "b'."

As the operation of the mechanism proceeds, the generally cylindrical articles 27–a are carried by the belt "b'" and finally reach the belt 14–a in proximity to the roll 12–a and receive labels 26–a therefrom and then almost immediately leave said belt 14–a. Subsequent to the deposit of a label on an article 27–a, the latter rolls along the pressure member or plate 21–a in operative relation with the associate belt 22–a. The latter cooperation with the pressure member or plate 21–a presses the label firmly into adhesive connection with the particular article.

Because of the inclined relation of the belt 14–a to the path of travel of the articles 27–a, the labels are not only properly deposited upon the articles, but subsequent to *deposit* the articles with the labels partially attached thereto are transported away from the labeling station to the subsequent station at which the belt 22–a in cooperation with the pressure member 21–a completes the application of the labels to the articles.

In all of its forms, the mechanism is simple in construction and operates with maximum efficiency to apply labels having thermo-activatable coatings to the articles for which said labels are designed.

Various changes in the specific forms shown and described may be made within the scope of the claims without departing from the spirit of the invention.

I claim:

1. A labeling mechanism comprising a roll, a companion hollow roll in spaced relation thereto and provided with perforations, a perforated belt traveling over and operated by said rolls, an enclosure between the runs of said belt and in communication with the interior of said perforated roll, a source of suction for developing a partial vacuum interiorly between the runs of said belt and within said perforated roll and effective through the perforations thereof to hold adhesive-coated labels in place thereon with the adhesive coatings exposed, for transportation over a given predetermined path, means for developing heat on the transported labels to activate the adhesive coatings thereof, a pressure member, a conveyor for transporting articles to be labeled into receiving relation with said belt to adhesively receive a label therefrom and then into contact with said pressure member, and a pressure belt cooperating with said pressure member to press said labels into adhesive connection with said articles.

2. A labeling mechanism comprising a roll, a companion hollow roll in spaced relation thereto and provided with perforations, a perforated belt traveling over and operated by said rolls, an enclosure between the runs of said belt and in communication with the interior of said perforated roll, a source of suction for developing a partial vacuum interiorly between the runs of said belt and within said perforated roll and effective through the perforations thereof to hold adhesive-coated labels in place thereon, with the adhesive coatings exposed for transportation over a predetermined path, means for developing heat on the transported labels to activate the adhesive coatings thereof, a pressure member, a conveyor for transporting articles to be labeled into receiving relation with said belt to adhesively receive a label therefrom and then into contact with said pressure member, and a pressure belt in divergent relation to said perforated belt cooperating with said pressure member to pass said labels into adhesive connection with said articles and to coincidentally divert the latter from said perforated belt.

3. A labeling mechanism comprising means for holding a supply of labels coated with unactivated but thermo-activatable adhesive adapted after activation to remain tacky for an appreciable interval of time, a labelling station, a single instrumentality constituting a means for conveying a label from said label supply to said labeling station and for applying said label to an article at said labeling station, and heating means independent of said conveying means and positioned alongside the path of travel of said label for activating said label prior to the completion of its conveyance to said labeling station.

4. In a labeling mechanism for applying to articles labels coated with a thermo-activatable adhesive, an endless continuously moving conveyor for transporting said labels into applying relation to said articles and for applying said labels thereto, suction means operative upon the labels while they are on said conveyor to hold them flat against the latter, and heating means alongside the path of travel for activating the adhesive on said labels as they pass by.

5. A labeling mechanism for applying labels having thermo-activatable coatings to articles, comprising heat developing means, an endless conveyor having a label-supporting surface arranged in a vertical plane, said conveyor being adapted to transport said labels in heat-exchange relation with said heat-developing means whereby said coatings are adhesively activated, and for adhesively depositing only the leading edges of said labels on vertically-disposed articles.

6. A labeling mechanism for applying labels having thermo-activatable coatings to articles, comprising heat developing means, an endless conveyor having a label-supporting surface arranged in a vertical plane, said conveyor being adapted to transport said labels in heat-exchange relation with said heat-developing means whereby said coatings are adhesively activated, and for adhesively depositing only the leading edges of said labels on vertically-disposed cylindrical articles, and means for rotating said articles and simultaneously pressing said labels into adhesive connection therewith.

7. In a machine of the character described, means for supplying sheets coated with unactivated but thermo-activatable adhesive, a heated endless conveyor adapted simultaneously to support a plurality of said sheets and to carry them successively from said supply to a point of sheet removal, whereby said adhesive becomes activated during the period of their support upon said conveyor, and pneumatic means for maintaining said sheets in intimate contact with the conveyor during the activation of said adhesive.

8. In a mechanism for applying adhesively coated sheet material to articles, means for feeding adhesive coated sheet material to a point of article application, means for feeding a succession of articles to and past said point of application without interruption of the continuous travel of each article, said sheet material feeding means being constructed and arranged to successively apply the leading edge of said sheet material to articles arriving at said point of application, and means for completing the adhesion of the sheet material to the articles as said articles continue their uninterrupted travel beyond said point of application comprising a movable pressure member located alongside the path of travel of the articles and engaging the applied sheet material, the sheet-engaging portion of said pressure member moving in the direction of travel of the articles during its engagement with said applied sheet material.

9. In a mechanism for applying adhesively coated sheet material to articles, an endless conveyor having a vertically disposed sheet-supporting surface for feeding adhesive coated sheet material to a point of article application, *means for supplying separate pieces of said sheet material to the vertically disposed surface of said endless conveyor with said separate pieces in spaced relation on such surface and their face surfaces in contact with said conveyor surface,* means for maintaining said sheet material on said surface during its travel to said point of application, means for feeding a succession of articles to and past said point of application without interruption of the continuous travel of each article, said conveyor being constructed and arranged to successively apply the sheet material at said point of application to vertically disposed surfaces of said articles, and means for completing the adhesion of the sheet material to the vertically disposed surfaces of said articles as said articles continue their uninterrupted travel beyond said point of application.

10. In a mechanism for supplying adhesively coated sheet material to be affixed to articles, an endless conveyor for feeding articles along a path of travel, an endless conveyor along one side of said article conveyor for feeding adhesive coated sheet material to a point in said path of travel and for successively applying said sheet material to articles passing said point, and means for completing the adhesion of said sheet material to said articles; said last-mentioned means comprising an endless belt having a run arranged alongside the path of travel of said articles to engage the applied sheet material thereon, and a spaced elongated member having *a driven* [an] article-engaging face opposed to said run and on the opposite side of the traveling articles.

11. In a mechanism for supplying adhesively coated sheet material to be affixed to articles, means for feeding articles in a non-rotating condition along a path of travel past a point of application, means for applying to an article, at said point of application, a portion of an adhesive coated sheet material so that the attached portion is in a leading position while the unattached portion is in a trailing position with relation to the direction of article travel, and means for completing the application of the sheet to the article by a progressive action.

12. The method of attaching adhesively coated sheet material to articles, comprising the steps of feeding [a] *an independent,* thermo-activatable adhesive coated sheet from an unactivated supply of said material *and carrying the same,*

*adhesive side out,* to a point of article application, moving said sheet *while being so carried* past a stationary source of heat during its travel from said supply to said point of application so that the coating is activated and its adhesiveness substantially increased as said sheet approaches said point of application, and then at the point of application affixing the activated sheet to an article with a progressive pressing action.

13. The method of attaching adhesively coated sheet material to articles, comprising the steps of continuously [feeding] *carrying spaced, independent pieces of* said sheet material to a point of article application, continuously feeding *a series of* articles *in spaced relation* to *and past* said point of application, applying an advanced portion of *a piece of* said sheet material *carried to said point of application* to an article at said point of application without interrupting the feed of the article or of the sheet material, and then completing the adhesion of the trailing portion of said sheet material with a progressive pressing action without interrupting the feed of said article.

14. The method of attaching adhesively coated sheet material to articles, comprising the steps of advancing articles along a path of travel past a point of application, advancing a spaced series of said sheets along a path which converges with the path of article travel at said point of application, continuously moving said sheets and articles past said point of application and at the same time applying an advanced portion of each sheet to a corresponding article, and then completing the adhesion of the trailing portion of said sheet to the article by a progressive pressing action and without interruption in the advancement of the article.

15. In a labeling machine, means for supporting a supply of sheet material coated on one surface with a thermo-activatable adhesive, a heat source, means for conveying said sheet material past said heat source to a point of application to an article to be labeled, end means for flexing said sheet material into conformity with a cylindrical surface during the subjection of said adhesive to the activating action of said heat source.

16. In a labeling machine, means for supporting a supply of sheet material coated on one surface with a thermo-activatable adhesive, a heat source, means for conveying said sheet material past said heat source to a point of application to an article to be labeled, and means for flexing said sheet material, coated side outward, into conformity with a cylindrical surface during the subjection of said adhesive to the activating action of said heat source.

17. In a labeling machine, means for supporting a supply of sheet material coated on one surface with a thermo-activatable adhesive, a heat source, means for conveying said sheet material past said heat source to a point of application to an article to be labeled, and means for flexing said sheet material, coated side outward, into conformity with a cylindrical surface during the subjection of said adhesive to the activating action of said heat source, said heat source being positioned so that it faces and thereby acts directly upon said coated surface.

18. In a method of applying to an article a label having on one of its surfaces a coating of thermo-activatable adhesive, the steps which consist in moving the label edgewise past a source of heat with the coated surface of the label facing toward said heat source, and flexing said label, coated side out, while said coating is subjected to the activating action of said heat source, into conformity with a cylindrical surface whose axis is perpendicular to the direction of said movement.

19. In a labeling machine, means for edgewise conveyance of a sheet of material coated with a thermo-activatable adhesive, means to activate the adhesive on said sheet while it is being conveyed, and means to direct said sheet through an arcuate path and thereby flex the sheet during the activation of said adhesive.

20. In a labeling machine, a heating means, and means for conveying past said heating means a label having a coating of thermo-activatable adhesive, said conveying means being so constructed that the initial heating of said label takes place while said label is in a plane and subsequent heating takes place while said label is in a flexed condition.

21. In a method of applying to an article a label having on one of its surfaces a coating of thermo-activatable adhesive, the steps which consist in moving [the] *an independent, held* label past a source of heat with the coated surface of the label facing toward said heat source so as to be activated thereby, and then pressing the activated adhesive surface against the article to be labeled.

22. In a labeling machine, an endless conveyor belt adapted to carry adhesive-coated labels on the surface thereof, means to feed labels to a run of said belt moving in one direction, means for conveying articles to be labeled to and past a run of the belt moving in the opposite direction, and means for applying said labels to said articles, respectively, at the region where they come into proximity.

23. In a labeling machine, means to support a roll of sheet material having a coating of thermo-activatable adhesive, a heated conveyor, means to feed off the outer layer of said roll in proximity to said conveyor, cutting means for severing successive end portions from said outer layer of said roll, and an element adjacent to said cutting means and which lies between said conveyor and said outer layer of said roll to shield said outer layer from the heating effect of said conveyor prior to the severance of said successive end portions.

24. In a mechanism for applying to articles labels that are coated with a thermo-activatable adhesive, means for continuously conveying labels in spaced relation from a supply thereof to a point of article application, means for applying heat to said labels and thereby rendering them adhesive as they progress to said point of application, and means for continuously feeding articles to said point of application, said conveying means being constructed and arranged to successively apply said labels to articles arriving at said point of application without interruption in the continuous conveyance of said labels or of the continuous feeding of said articles.

25. The method of labeling an article which consists in moving said article along a straight path to a label depositing point, moving to said point along another path, a label having on one of its surfaces a coating of thermo-activatable adhesive, heating said label to activate said adhesive coating, adhesively attaching a restricted portion of the label to the article at said label depositing point, moving the article further along said straight path beyond the label depositing point with the partially attached label thereon, and completing the adhesive attachment of the label to the article at another point spaced from said label depositing point.

26. In a labeling machine, a conveyor for carrying a succession of articles, means for feeding a continuous web of sheet material, means for cutting a succession of labels from the end of said web, and a movable label conveying means having a label supporting surface and mounted for movement of said surface along a closed path one part of which is adjacent to the cutting means and another part of which is adjacent to said article conveyor, said label supporting surface being disposed for tangential engagement with successive articles carried by said article conveyor, whereby said conveying means is adapted to transport said labels in spaced relation from said cutting means to said article conveyor and there deposit them onto successive articles carried by said article conveyor.

27. In a labeling machine, means for attaching an edge portion of an adhesively coated label to an article at a predetermined station of the machine, article carrying means for bringing the article into operative relation with the label attaching means at said predetermined station and for carrying the article from such station to a succeeding station of the machine with the attached portion of the label in a leading position with relation to the direction of travel of the article and with the unattached portion thereof in a trailing position with relation to such direction of travel, and means at said succeeding station of the machine for completing the application of the label to the article, said last mentioned means including a pair of spaced members arranged to press on opposite surface portions of the article and being relatively movable so as to cause the article to advance with a rolling movement therebetween, said members during such rolling movement of the article completing the application of the label thereto.

28. In a labeling machine, means for attaching an edge portion of an adhesively coated label to an article at one station of the machine, an article carrying device for bringing the article into operative relation with the label attaching means at said station and for moving the article to a second station to complete the application of the label to the article, the application of the label at said first station and the movement of the article to said second station by said device being such that the attached portion of the label is in a leading position with relation to the direction of travel of the article and the unattached portion of the label trails behind the article during such movement, and a pair of spaced members located at said second station and arranged to press on opposite surface portions of the article and being relatively movable so as to cause the article to advance with a rolling movement therebetween, said members during such rolling movement of the article completing the application of the label thereto.

29. In a labeling machine, means for attaching an edge portion of an adhesively coated label to an article, an article carrying device for bringing the article into operative relation with the label attaching means and for moving said article to another part of the machine with the attached portion of such label in a leading position with relation to the direction of travel of the article and with the unattached portion of said label in trailing position with relation to such direction of travel, and means at said other part of the machine for completing the attachment of the label to the article, said last mentioned means being constructed and arranged to press on opposite surface portions of the article so as to cause the latter to advance with a rolling movement therebetween and during such rolling movement of the article to complete the application of the label thereto.

30. In a labeling machine, means for carrying an article to a plurality of labeling means, air controlled means for applying to such article a portion of an adhesively coated label so that the attached portion of such label is in a leading position with relation to the direction of travel of the article and the unattached portion thereof is in a trailing position with relation to such direction of travel, and a succeeding labeling means including a member for rotating such article and during the rotational movement of the latter for completing the application of the label thereto.

31. In a labeling machine, means for feeding a plurality of articles in spaced relation and predetermined timed relation to labeling means, labeling means for successively applying to such articles a portion of an adhesively coated label so that the attached portion of each label is in a leading position with relation to the direction of travel of the articles and the unattached portion thereof is in a trailing position with relation to such direction of travel, and a succeeding labeling means including a pair of spaced members between which the articles travel, one of said members being movable relative to the other in the direction of travel of the articles and said members cooperating to rotate the articles positioned therebetween while traveling therethrough, said members during such rotational movement of the articles completing the application of the labels thereto.

32. In a labeling machine, a conveyor to support a cylindrical article on its base in an upstanding position and convey it in that position past a labeling station at which adhesive contact is established between the cylindrical surface of said article and one end of an adhesive label, and cooperating elements between which said article passes, one of said elements being a relatively stationary vertical plate and the other having a movable part adapted to press said article against said plate in rolling contact with the latter to complete the application of said label.

*33. A labeling machine for cylindrical bottles and like articles comprising means to render adhesive one face of a label, a label delivery member with suction openings, means to transfer a separate, unitary label, adhesive side out, to the delivery member, for the label to be held by suction applied to its non-adhesive face, and means to roll an article over the delivery member to apply the label to the article.*

*34. A labeling machine as in claim 33, wherein the means for rolling an article over the delivery member comprises a member having an article engaging portion located in opposed, spaced relation to said delivery member at the place the latter applies the label to the article, said article engaging portion of said member being constructed and arranged relative to said delivery member to form a nip through which the article passes.*

*35. A labeling machine for cylindrical bottles and like articles comprising means for conveying an article on its base in an upstanding position past a labeling station at which adhesive contact is established between the cylindrical surface of the article and an adhesive label, a label delivery member with suction openings located on one side of said conveying means, means to transfer a separate, unitary label, adhesive side out, to the delivery member, of the label to be held by suction applied to its non-adhesive face, and means to roll an article over the delivery member to apply the label to the article, said last-mentioned means being positioned on the other side of said conveying means and having an article engaging portion located in opposed, spaced relation to said delivery member at the place the latter applies the label to the article, said article engaging portion and said delivery member forming a nip through which the conveyed article passes.*

*36. A labeling machine for cylindrical bottles and like articles, said machine comprising an apertured member, means for moving apertured surface portions of said apertured member to different positions, means at one of such positions to apply a label, adhesive side out, to an apertured surface portion of said member, for the label to be held by suction applied through the apertures of such member to the label's non-adhesive face, a conveyor for cylindrical articles at another of said positions and constructed and arranged to continuously feed a series of such articles past such position, and means at said last mentioned position coacting with said apertured member to roll an article on the conveyor over the surface portion of such apertured member at such position to apply the label to the article.*

*37. A labeling machine for cylindrical bottles and like articles, comprising means for conveying an article on its base in an upstanding position past a labeling station at which adhesive contact is established between the cylindrical surface of the article and an adhesive label, and cooperating means at said labeling station between which an article on said conveying means passes, one of said cooperating means constituting label delivery means and having suction openings to provide for holding thereto a label applied to a surface portion thereof, and the other of said cooperating means coacting with said first mentioned cooperating means to rotate an article on said conveying means and during such rotation to progressively apply the label to the article, one of said cooperating means being surfaced with resilient material, and one of said cooperating means having a vertical surface portion maintained stationary relative to the other cooperating means at the time of such label application and the other of such means having a part movable relative to such vertical surface portion at the time of such label application for pressing the article in rolling contact against such vertical surface portion.*

*38. A labeling machine for cylindrical bottles and like articles, comprising means for conveying an article on its base in an upstanding position past a labeling station at which adhesive contact is established between the cylindrical surface of the article and an adhesive label, a label delivery member with suction openings for delivering labels to said labeling station, means to transfer a separate, unitary label, adhesive side out, to the delivery member, for the label to be held by suction applied to its non-adhesive face, and means to roll an article over the delivery member at such labeling station to apply the label to the article.*

*39. A labeling machine for cylindrical bottles and like articles, comprising means for conveying an article on its base in an upstanding position past a labeling station at which adhesive contact is established between the cylindrical surface of the article and an adhesive label, a label delivery means with suction openings located on one side of said conveying means, means to transfer a separate, unitary label, adhesive side out, to said label delivery means, for the label to be held by suction applied to its non-adhesive face, and means positioned on the other side of said conveying means and coacting with said label delivery means to rotate an article on said conveying means and to apply to the article during such rotating action a label delivered by said label delivery means.*

*40. A labeling machine for cylindrical bottles and like articles, comprising means for conveying an article on its base in an upstanding position past a labeling station at which adhesive contact is established between the cylindrical surface of the article and an adhesive label, a label delivery means with suction openings located on one side of said conveying means, means to transfer a separate, unitary label adhesive side out, to said label delivery means, for the label to be held by suction applied to its non-adhesive face, and means positioned on the other side of said conveying means and coacting with said label delivery means to rotate an article on said conveying means and to apply to the article during such rotating action a label delivered by said label delivery means, one of said coacting label delivery and last mentioned means having at such labeling station a relatively flat surface portion disposed in substantial parallelism to the forward feed of the article during the application of the label thereto, and the other of said coacting label delivery and last mentioned means including a rotatably mounted member coacting with said flat surface portion and constructed and arranged to press said article against said flat surface portion in rolling contact with the latter as the article continues its forward movement.*

*41. A labeling machine for cylindrical bottles and like articles, comprising means for conveying an article on its base in an upstanding position past a labeling station at which adhesive contact is established between the cylindrical surface of the article and an adhesive label, a rotatably mounted label delivery member with suction openings, means to transfer a separate, unitary label, adhesive side out, to the delivery member, for the label to be held by suction applied to its non-adhesive face, means for rotatably moving said member to bring the label with its adhesive side, in adhering condition, disposed outwardly, to said labeling station, and means coacting with said delivery member to rotate the article on said conveying means and to apply to the article during such rotating action the label delivered by said delivery member.*

*42. In a labeling machine, means for continuously feeding a train of articles in spaced relation along a predetermined path, means located on one side of said predetermined path for supplying successive, spaced labels to a fixed place of application alongside such path between the ends of the latter with each delivered label arranged to be brought into adhesive contact with an article moving past said place of application, said label supply means including rotatable apertured means adapted to support a plurality of labels by suction applied through apertures of such means, means for rotating said apertured means to move the surface portions thereof to different positions in a closed path, one of said positions being said place of application, and means at another of such positions to successively apply separate, unitary labels for successive articles in said train thereof to said apertured means, and means located at a fixed station along the path of travel of the articles and disposed in spaced relation on opposite sides of said article path to engage the articles fed therebetween, one of said means being movable relative to the other during their engagement with an article so as to press such article against such other means as such article continues its feed along said path, said last mentioned means coacting during such pressing of the article to cause the latter to have movement relative to at least one of said coacting means and to completely apply the label to the article while the latter continues its forward motion on said article feeding means.*

*43. In a labeling machine, means for feeding a train of articles in spaced relation along a predetermined path, means located on one side of said predetermined path for supplying successive, spaced labels to a fixed place of application alongside such path between the ends of the latter, with each delivered label arranged to be brought into adhesive contact with an article moving past said place of application, said label supply means including rotatable apertured means adapted to support a plurality of labels by suction applied through apertures of such means, means for rotating said apertured means to move the surface portions thereof to different positions in a closed path, one of said positions being said place of application, and means at another of such positions to successively apply separate, unitary labels for successive articles in said train thereof to said apertured means, and means disposed in spaced relation on opposite sides of said article path to engage the articles fed therebetween, one of said means being movable relative to the other during their engagement with an article so as to press such article against such other means as such article continues its feed along said path, said last mentioned means being constructed and arranged to coact during such pressing of the article to rotate on said article feeding means an article positioned therebetween while traveling therethrough, said cooperating means during such rotational movement of the article completing the application of the label thereto.*

*44. In a labeling machine, means for feeding a train of articles in spaced relation along a predetermined path, means located at one side of said predetermined path for supplying successive, spaced labels to a fixed place of application alongside such path between the ends of the latter with each delivered label arranged to be brought into adhesive contact with an article moving past said place of application, said label supply means including rotatable apertured means adapted to support a plurality of labels in spaced relation thereon by suction applied through apertures of such means, means for rotating said apertured means to move the surface portions thereof to different positions along a closed path, one of said positions being said place of application at which position adhesive contact is established between a surface portion of an article and a label carried by said aper-* tured means while the article continues its forward motion along said path, and said label supply means including means located at another of such positions spaced from said place of application to successively apply separate, unitary labels for successive articles in said train thereof to said apertured means, said last mentioned means being mounted for reciprocal movement toward and away from said apertured means and operable in its reciprocal movement toward said apertured means to apply a label to the latter, and means located at a fixed station along the path of travel of the articles and disposed in spaced relation on opposite sides of said article path to engage the articles fed therebetween, one of said means being movable relative to the other during their engagement with an article so as to press such article against such other means as such article continues its feed along said path, said last mentioned means coacting during such pressing of the article to cause the latter to have movement relative to at least one of said coacting means and to completely apply the label to the article while the latter continues its forward motion on said article feeding means.

45. In a labeling machine, means for feeding a train of articles in spaced relation along a predetermined path, means located at one side of said predetermined path for supplying successive, spaced labels to a fixed place of application alongside such path between the ends of the latter with each delivered label arranged to be brought into adhesive contact with an article moving past said place of application, said label supply means including rotatable apertured means adapted to support a plurality of labels in spaced relation thereon by suction applied through apertures of such means, means for rotating said apertured means to move the surface portions thereof to different positions along a closed path, one of said positions being said place of application at which position adhesive contact is established between a surface portion of an article and a label carried by said apertured means while the article continues its forward motion along said path, means at another of such positions spaced from said place of application to successively apply separate, unitary labels for successive articles in said train thereof to said apertured means, said last mentioned means being mounted for reciprocal movement toward and away from said apertured means and having a label engaging surface disposed in substantially parallel relation to the apertured surface portion of said apertured means to which said reciprocal means is to apply a label in the reciprocal movement of such surface toward said apertured means, and said label supply means including means for feeding labels into position to be engaged by the label engaging surface of said reciprocal means for delivery to said apertured means, and means located at a fixed station along the path of travel of the articles and disposed in spaced relation on opposite sides of said article path to engage the articles fed therebetween, one of said means being movable relative to the other during their engagement with an article so as to press such article against such other means as such article continues its feed along said path, said last mentioned means coacting during such pressing of the article to cause the latter to have movement relative to at least one of said coacting means and to completely apply the label to the article while the latter continues its forward motion on said article feeding means.

46. In a labeling machine, means for continuously feeding a train of articles in spaced relation along a predetermined path, means located on one side of said predetermined path for supplying successive, spaced labels to a fixed place of application alongside such path between the ends of the latter with each delivered label arranged to be brought into adhesive contact with an article moving past said place of application, said label supply means including rotatable means constructed and arranged to support successive, spaced labels thereon for movement of such labels along a portion of a closed path during the rotational movement of such means, means for rotating said rotatable means to move the surface portions thereof to different positions along such closed path, one of said positions being said place of application, and means at another of such positions to successively apply separate, unitary labels for successive articles in said train thereof to said rotatable means, said applying means being mounted for reciprocal movement toward and away from said rotatable means and operable in its reciprocal movement toward said rotatable means to apply a label to the latter, and means along said article path for engaging opposite sides of an article in such train thereof and including a first element disposed on one side of said article path, a second element located on the opposite side of said article path and movable relative to said first element, said second element being constructed and arranged to press an article against said first element as such article continues its forward feed along said article path, and said elements coacting during such pressing of the article to completely apply the label to the article, and means for moving said second element so that the article engaging portion thereof moves substantially in the direction of the forward feed of the article on said article path during the engagement of such element with an article, whereby the forward motion of the article is continuous during the application and complete attachment of the label thereto.

47. In a labeling machine, means for feeding a train of articles in spaced relation along a predetermined path, means located at one side of said predetermined path for supplying successive, spaced labels to a fixed place of application alongside such path between the ends of the latter with each delivered label arranged to be brought into adhesive contact with an article moving past said place of application, said label supply means including rotatable apertured means adapted to support a plurality of labels in spaced relation thereon by suction applied through apertures of such means, means for rotating said apertured means to move the surface portions thereof to different positions along a closed path, one of said positions being said place of application at which position adhesive contact is established between a surface portion of an article and a label carried by said apertured means while the article continues its forward motion along said path, and said label supply means including means located at another of such positions spaced from said place of application to successively apply separate, unitary labels for successive articles in said train thereof to said apertured means, said applying means including means for supporting a supply of labels with the labels standing on edge, and means for depositing a label from said supply on said apertured means, with the face surface of the label engaging said apertured means to be held by suction, said last mentioned means including reciprocating means to move a separate, unitary label toward said apertured means when applying a label to the latter and to move away from said apertured means between the intermittent application of labels to the latter, and means located at a fixed station along the path of travel of the articles and disposed in spaced relation on opposite sides of said article path to engage the articles fed therebetween, one of said means being movable relative to the other during their engagement with an article so as to press such article against such other means as such article continues its feed along said path, said last mentioned means coacting during such pressing of the article to cause the latter to have movement relative to at least one of said coacting means and to completely apply the label to the article while the latter continues its forward motion on said article feeding means.

48. In a labeling machine, means for continuously feeding a train of articles in spaced relation along a predetermined path, means located on one side of said predetermined path for supplying successive, spaced labels to a fixed place of application alongside such path between the ends of the latter with each delivered label arranged to be brought into adhesive contact with an article moving past said place of application, said label supply means including rotatable apertured means adapted to support a plurality of labels by suction applied through apertures of such means, means for rotating said apertured means to move the surface portions thereof to different positions in a closed path, one of said positions being said place of application, means for supporting a supply of labels with the labels standing on edge, means at another of such positions for transferring separate, unitary labels for successive articles in said train thereof from said supply in a successive fashion to said apertured means so that the labels are in spaced relation on the latter and with their face surfaces engaging said apertured means to be held by suction, and said label supply means including means for rendering the back surface of a label adhesive during its travel from said supply to said place of application, and means located at a fixed station along the path of travel of the articles and disposed in spaced relation on opposite sides of said article path to engage the articles fed therebetween, one of said means being movable relative to the other during their engagement with an article so as to press such article against such other means as such article continues its feed along said path, said last mentioned means coacting during said pressing of the article to cause the latter to have movement relative to at least one of said coacting means and to completely apply the label to the article while the latter continues its forward motion on said article feeding means.

49. In a labeling machine, means for continuously feeding a train of articles in spaced relation along a predetermined path, means located on one side of said predetermined path for supplying successive, spaced labels to a fixed place of application alongside such path between the ends of the latter with each delivered label arranged to be brought into adhesive contact with an article moving past said place of application, said label supply means including rotatable means constructed and arranged to support successive, spaced, vertically disposed labels thereon for movement of such labels along a portion of a closed path during the rotational movement of such means, means for rotating said rotatable means to move the surface portions thereof to different positions along such closed path, one of said positions being said place of application at which place the path of feed of the labels on said rotatable means is curved and the path of feed of the articles on said article feeding means is tangential to such curved portion of the label path, means for supporting a supply of labels with the labels standing on edge, means for transferring separate, unitary labels for successive articles in said train thereof from said supply in a successive fashion to said rotatable means at another of such positions and so that the labels are in spaced relation on the latter and with their face surfaces engaging said rotatable means, and said label supply means including means stationed along the path of travel of a label from said supply to said place of application to render the back surfaces of such labels adhesive, and means for completing the adhesion of a label to an article in such train at a place on such path located in subsequent spaced relation to said place of label application, said last mentioned means including a pair of elements located on opposite sides of said article path and constructed and arranged to coact at such place of article engagement to complete by a pressing operation the attachment of a label to an article in such train positioned between such elements at such place of article engagement, the element located on the same side of the article path as said supply means being movable, and means for moving said last referred to element so that the article engaging portion thereof moves substantially in the direction of the forward feed of the article on said article path during its engagement with such article, whereby the forward motion of the article is continuous during the application and complete attachment of the label thereto.

50. In a labeling machine, means for continuously feeding a train of articles in spaced relation and in an at-rest condition along a predetermined path, means located on one side of said predetermined path for supplying successive, spaced labels to a fixed place of application alongside such path between the ends of the latter, with each delivered label arranged to be brought into adhesive contact with an article moving past said place of application, said label supply means including rotatable means having a vertically disposed label carrying surface of substantially greater area than the area of an individual label to be carried thereby, means for rotating said rotatable means to move such label carrying surface thereof to different positions along a closed path, one of said positions being said place of application, means for supporting a supply of labels with the labels standing vertically on edge, means for transferring separate, unitary labels for successive articles in said train thereof from said supply in a successive fashion to the label carrying surface of said rotatable means so that the labels are carried thereby in vertically disposed fashion with their face surfaces in opposed relation to such carrying surface, and said label supply means including means for rendering the back surface of a label adhesive during its travel from said supply to said place of application, and means along-

*side said article path for engaging opposite sides of an article in such train thereof, in its forward feed on said article feeding means, said last mentioned means including a first element having a surface disposed on one side of and generally in substantial parallelism with the path of forward feed of the articles, a second element located on the opposite side of said article path and movable relative to the surface of said first element, said second element being constructed and arranged to enable it to press an article toward the surface of said first element as such article continues its forward feed along said path, said elements coacting during such pressing of the article to completely apply the label to the article, and means for moving said second element so that the article engaging portion thereof moves substantially in the direction of the forward feed of the article on said article path during its engagement with such article, whereby the forward motion of the article is continuous during the application and complete attachment of the label thereto.*

GEORGE W. VON HOFE.

REFERENCES CITED

The following references are of record in the file of this patent or the original patent:

UNITED STATES PATENTS

| Number | Name | Date |
|---|---|---|
| 488,791 | Leach | Dec. 27, 1892 |
| 555,644 | Guerrant | Mar. 3, 1896 |
| 671,005 | Sherman | Apr. 2, 1901 |
| 781,333 | Edson | Jan. 31, 1905 |
| 866,091 | Tucker | Sept. 17, 1907 |
| 931,639 | Orr | Aug. 17, 1909 |
| 1,078,723 | Dodge | Nov. 18, 1913 |
| 1,079,058 | Michel et al. | Nov. 18, 1913 |
| 1,198,981 | Weiss | Sept. 18, 1916 |
| 1,316,225 | Dewey | Sept. 16, 1919 |
| 1,434,731 | Ball | Nov. 7, 1922 |
| 1,700,005 | Wall | Jan. 22, 1929 |
| 1,716,445 | Johnson et al. | June 11, 1929 |
| 1,998,615 | Groven | Apr. 23, 1935 |
| 2,042,164 | Wild | May 26, 1936 |
| 2,065,957 | Wrange | Dec. 29, 1936 |
| 2,072,875 | Gray | Mar. 9, 1937 |
| 2,178,979 | Von Hofe | Nov. 7, 1939 |
| 2,192,265 | Kallander | Mar. 5, 1940 |
| 2,214,096 | Weiss | Sept. 10, 1940 |
| 2,280,730 | Talbot | Apr. 21, 1942 |
| 2,320,513 | Drummond | June 1, 1943 |
| 2,363,277 | Anderson | Nov. 21, 1944 |
| 2,402,631 | Hull | June 25, 1946 |
| 2,509,517 | Neer | May 30, 1950 |

Certificate of Correction

Reissue No. 23,512 June 10, 1952

GEORGE W. VON HOFE

It is hereby certified that error appears in the printed specification of the above numbered patent requiring correction as follows:

Column 7, line 53, for "an" read *a driven* [an]; line 56, after "having" strike out "*a driven* [an]" and insert instead an ; column 8, line 45, for "end means" read and means ;

and that the said Letters Patent should be read as corrected above, so that the same may conform to the record of the case in the Patent Office.

Signed and sealed this 7th day of October, A. D. 1952.

[SEAL]

THOMAS F. MURPHY,
*Assistant Commissioner of Patents.*